(12) United States Patent
Ljunggren

(10) Patent No.: US 9,309,464 B2
(45) Date of Patent: Apr. 12, 2016

(54) METHOD AND EQUIPMENT FOR PRODUCING COKE DURING INDIRECTLY HEATED GASIFICATION

(75) Inventor: Rolf Ljunggren, Sollentuna (SE)

(73) Assignee: CORTUS AB, Kista (SE)

(*) Notice: Subject to any disclaimer, the term of this patent is extended or adjusted under 35 U.S.C. 154(b) by 442 days.

(21) Appl. No.: 13/878,884

(22) PCT Filed: Oct. 10, 2011

(86) PCT No.: PCT/SE2011/000176
§ 371 (c)(1),
(2), (4) Date: Apr. 11, 2013

(87) PCT Pub. No.: WO2012/050498
PCT Pub. Date: Apr. 19, 2012

(65) Prior Publication Data
US 2013/0192972 A1 Aug. 1, 2013

(30) Foreign Application Priority Data
Oct. 11, 2010 (SE) ........................ 1001004

(51) Int. Cl.
*C10J 3/00* (2006.01)
*C10B 21/00* (2006.01)
*C10B 47/18* (2006.01)
*C10J 3/48* (2006.01)

(52) U.S. Cl.
CPC .................. *C10B 21/00* (2013.01); *C10B 47/18* (2013.01); *C10J 3/485* (2013.01); *C10J 2300/093* (2013.01); *C10J 2300/0969* (2013.01); *C10J 2300/0976* (2013.01); *C10J 2300/1207* (2013.01); *C10J 2300/1269* (2013.01); *C10J 2300/1625* (2013.01); *C10J 2300/1884* (2013.01); *C10J 2300/1892* (2013.01); *Y02P 20/129* (2015.11)

(58) Field of Classification Search
CPC .......... C10B 47/18; C10B 21/00; C10J 3/485; C10J 2300/0976
See application file for complete search history.

(56) References Cited

U.S. PATENT DOCUMENTS 2,265,158 A 12/1941 Goodell
4,007,014 A 2/1977 Matsumoto et al.
(Continued)

FOREIGN PATENT DOCUMENTS

SE 532711 C2 3/2010
WO 2009060461 A2 5/2009

OTHER PUBLICATIONS

International Search Report, dated Dec. 14, 2011, from corresponding PCT application.

*Primary Examiner* — Matthew Merkling
(74) *Attorney, Agent, or Firm* — Young & Thompson

(57) ABSTRACT

Method and equipment for producing coke (PC) during indirectly heated gasification, in which coal particles are supplied to a gasification reactor (1) and process gas (P) supplied during the gasification is reduced in it to synthesis gas (S), whereby the synthesis gas (S) is removed from the gasification reactor (1). The method is distinguished in that at the same time a gasification takes place, a coking of coal takes place in an inner reactor (4) arranged inside the gasification reactor (1), that the inner reactor (4) is indirectly heated, that coke (PC) and combustible gases are produced in the inner reactor (4) during the coking, and that the combustible gases are used for the indirect heating in the gasification in the gasification reactor (1).

16 Claims, 1 Drawing Sheet

(56) References Cited

U.S. PATENT DOCUMENTS

| | | |
|---|---|---|
| 4,122,036 A | 10/1978 | Lewis |
| 4,439,209 A | 3/1984 | Wilwerding et al. |
| 5,198,018 A | 3/1993 | Agarwal |
| 6,648,932 B1 | 11/2003 | Maton |
| 6,669,822 B1 | 12/2003 | Fujimura et al. |
| 2009/0260286 A1 | 10/2009 | Sasauchi et al. |
| 2009/0293783 A1 | 12/2009 | Shuman et al. |
| 2011/0099903 A1 | 5/2011 | Ljunggren |

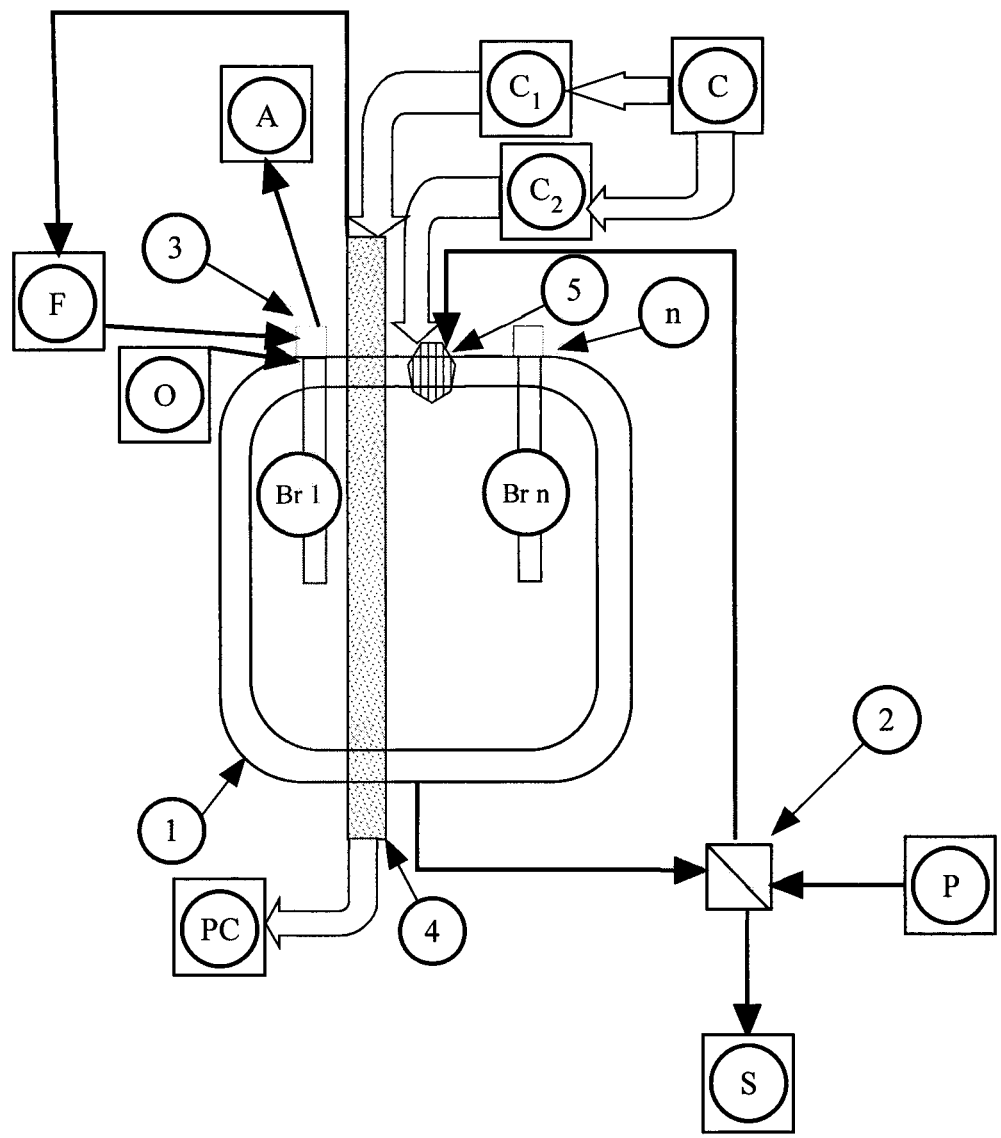

METHOD AND EQUIPMENT FOR PRODUCING COKE DURING INDIRECTLY HEATED GASIFICATION

TECHNICAL AREA OF THE INVENTION

The present invention refers to a method for producing coke during indirectly heated gasification, in which coal particles are supplied to a gasification reactor and process gas supplied during the gasification is reduced in it to synthesis gas, whereby the synthesis gas is removed from the gasification reactor. The invention also relates to equipment for carrying out the method.

PRIOR ART

Coal is a basic substance that is our most important energy source but also an important chemical in many types of processes. The strong reduction potential of coal is used in, e.g., metallurgical processes where iron ore is reduced with coal. Furthermore, the recovery of oxidic residual material from the steel industry is an example of the use of coal. These processes are currently primarily based on fossil coal that is pre-treated in order to obtain the proper strength and properties for the process in, for example, coke furnaces. The emission of carbon dioxide from these types of processes should be able to be reduced if renewable coal (based on biomass) is able to be introduced. This patent describes a method for the production of coal/coke for application as, e.g., reduction agent by the carburization of coal during the indirectly heated gasification of biomass.

Gasification is a process for producing gaseous fuel from solid fuel. The technology is used for coal, residual coal products, petroleum residues, waste and biomass. The reactions are based on the fact that oxidizing gases (e.g., $CO_2$ and $H_2O$) are heated and react with coal ([C] reducing agent), during which carbon monoxide (CO) and hydrogen gas (H2) are formed in that heat is used to drive the reactions, that are endothermic. The gaseous mixture of carbon monoxide (CO) and hydrogen gas (H2) is usually called synthesis gas.

A customary way to gasify is to burn coal in a heavily sub-stoichiometric manner under the supplying of overheated steam. The combustion supplies heat and waste combustion gases ($CO_2$ and $H_2O$) to the equipment. Coal which is not burnt but now overheated reacts with waste gases and supplied steam. The coal (C) reduces carbon dioxide ($CO_2$) to carbon monoxide (CO) and water vapour ($H_2O$) to hydrogen gas (H2). The heat that is used lowers the temperature and the reactivity decreases. The reactivity for coal is heavily temperature-dependent while the equilibrium for the reactions is temperature-dependent. Combustion based on oxygen gas is currently the dominant method for burning in conjunction with gasification even though air-based combustion occurs.

The problem with the gasification of coal, residual coal products, petroleum residues, waste and biomass is that they are not homogeneous material but rather components with different weights (tar) and complicated components (aromatics) are released during the reaction. These components cannot be reliably reacted but rather have to be separated subsequently before the synthesis gas can be used or further refined to liquid hydrocarbons or other fuels.

These components with different weights (tar) and complicated components (aromatics) can be separated by pyrolysing coal, residual coal products, petroleum residues, waste and biomass before the gasification reaction. The pyrolysis product now obtained and consisting of condensable products and gases can be used as fuel in the gasification process. In the gasification described above the pyrolysis reaction is a part of the process. However, the components with different weights (tar) and complicated components (aromatics) are in the same reactor as the synthesis gas that is desired from the process. The consequence of this is that the handling of components with different weights (tar) and complicated components (aromatics) becomes a limiting factor for how effective the gasification process can become without physical problems such as condensation, cladding and the like occurring in the reactor itself.

An apparatus and a method for the reactivation of active coal are previously known from U.S. Pat. No. 4,007,014. The apparatus comprises a retort reactor and an inner reactor to which activated coal is supplied, whereby the supplied, activated coal is reactivated in that reactor gas in the form of steam is brought in contact with activated coal passing down into the inner reactor. In order that the reactor gas can be able to come into the inner reactor, the reactor is provided with openings in its jacket surface, i.e., an exchange of gas takes place between the retort reactor and the inner reactor. This is quite the contrary to one of the basic principles of the present invention.

A method and equipment for the production of synthesis gas is previously known from SE 532711, whereby an indirect heating up of a reactor takes place via burners present in the reactor.

OBJECTS AND FEATURES OF THE INVENTION

A primary object of the present invention is to indicate a method and equipment where the problems with the purification of synthetic gas and physically limiting phenomena in accordance with the above can be managed by using an indirectly heated gasification reactor.

The simultaneous carburization of coal during indirectly heated gasification means that heat for the carburization can be obtained from the reactor for the gasification process. A heating reactor designed for the purpose and with a separate flow is arranged in the gasification reactor. The heating reactor for the coal is indirectly heated by radiation inside the gasification reactor. The coal is fed into the top of this inner heating reactor in order to be heat-treated to a high temperature in the gasification reactor before the coal, which is now coked, is fed out at the bottom. The gases travel upwards through the reactor and the coal downwards. This counterflow movement equalizes the temperature and variations in the composition in the reactor. Heavier components like aromatics can be cracked to smaller molecules by virtue of the high temperature in the reactor. The combustible gases from the coking are returned and mixed with the fuel gases which the pyrolysis of the biomass gave off. The entire fuel-gas volume can be used for the heating requirement of drying, pyrolysis, coking and gasification. If any excess is produced, it can advantageously be used for further energy requirements or the like.

The objects and the features of the invention are realized by a method and equipment that have been given the features of the following independent claims. Preferred embodiments of the invention are defined in the dependent claims.

BRIEF DESCRIPTION OF THE FIGURES

A preferred embodiment in accordance with the invention is described below with reference made to the attached drawings, in which:

FIG. 1 shows a flowchart for a preferred method in accordance with the present invention, which flowchart also schematically shows units that form an equipment for carrying out the method.

DETAILED DESCRIPTION OF A PREFERRED EMBODIMENT IN ACCORDANCE WITH THE INVENTION

FIG. 1 schematically shows a number of units that form the equipment for carrying out the method. The lines, pipes, etc. that couple the equipment's units together are not described or shown in detail. The lines, pipes, etc. are suitably formed for carrying out their function, i.e., to transport the gases and solid substances between the equipment's units.

FIG. 1 shows an indirectly heated gasification reactor 1 that is normally a ceramically lined reactor. The reactor is formed in such a manner that it can gasify and coke coal particles C in two separate flows $C_1$ and $C_2$. Therefore, an inner reactor 4 for coking the coal was introduced into the gasification reactor 1. Solid coal particles are supplied partially to the inner reactor 4 via flow $C_2$ and partially to gasification reactor 1 via flow $C_1$ together with the process gas P through an injection nozzle 5. The coal particles C come from a pyrolysis that precedes the gasification. The size of the coal particles C in the flow $C_1$ is preferably sufficient so that they can be carried by an incoming gas current with process gas P into the gasification reactor 1. The coal particles to the inner reactor 4 are normally larger than those in the outer gasification reactor 1. The process gas P can be steam or recovered or purified waste gas A from the combustion stage. The coking in the inner reactor 4 decreases the amount of coal in this flow in that combustible gases similar to pyrolysis gas but with a composition that is controlled by the reactor temperature, which is now significantly higher, are formed. The rise in temperature at 300° C. to 700° C. for the coal in the inner reactor 4 above the temperature in the previous pyrolysis is expected to reduce the solid coal component by 10 to 35%.

If the process gas P is recovered waste gas A, it can contain water vapour (H2O) and carbon dioxide (CO2). The process gas P is preheated from heat extracted from outgoing synthetic gas S in heat exchanger 2. The reaction that takes place in gasification reactor 1 is when flow $C_1$, that is injected through the injection nozzle 5, reduces the content in the process gas P (H2O and CO2) to synthetic gas S (H2 and CO), which consumes the heat supplied to the process by burners Br 1 to Br n. The coking reaction takes place in parallel in the inner reactor 4 by the supplying of heat from burner Br 1 to Br n via the ongoing gasification process.

Gasification reactor 1 is heated indirectly by burners Br 1 to Br n (where n designates the number of burners necessary for the gasification reactor 1). The inner reactor 4 is heated in the same indirect manner by Br 1 to Br. n. Heat is supplied to the gasification reaction by radiation from Br 1 to Br n, where the combustion takes place inside radiation tubes, i.e., separated from the gasification flow. No direct exchange of gas takes place in the gasification reactor 1 between Br 1 to Br n and the process gas P or its reaction products. The inner reactor 4 also has no exchange of gas with the gasification process ongoing in the gasification reactor 1.

The burners Br 1 to Br n are supplied with fuel F preferably from an earlier pyrolysis step of a material containing coal. Oxidation agent O in the form of air, air enriched with oxygen gas or pure oxygen gas is supplied to the combustion. Heat exchanger 3 extracts the heat from outgoing waste gases A and preheats incoming oxidation agent O. Waste gases A go to the flue gas purification, where requirements concerning emissions for the process are met with cyclones, catalytic purification, filters (electrical or textile) and scrubbers as required by the incoming coal-containing material.

The coal C comes from an earlier pyrolysis step and contains remnants of ash. By controlling the temperature in the gasification reactor 1 to either below (or above) the melting temperature for the ash, it can preferably be removed by a subsequent high-temperature cyclone (or in a flowing form such as slag).

Outgoing synthesis gas S can be used as energy gas for combustion purposes or as a base for further refinement to liquid fuels (Fischer Tropsch for typical vehicle fuels, ethanol production or the like).

The pressure in the gasification reactor 1 can be controlled from atmospheric pressure to much higher pressures (>100 bar (g)).

The temperature in the gasification reactor 1 and the inner reactor 4 is controlled so as to achieve the best yield of synthesis gas S and coke PC. A typical value is within the interval of 750-1300° C.

An alternative execution of the indirect heating of the process gas P and the coal C can be arranged in a tube system inside a reactor where the combustion takes place in such a reactor and in this case the tube system becomes the gasification reactor 1 and inner reactor 4. The design can be considered to be a furnace more than anything else but with a differently higher temperature.

The geometry for gasification reactor 1 is controlled from the requirement of the reaction time in the gasification process, which for its part is controlled by the temperature selected. The geometry for the inner reactor 4 is controlled from the mass flow of coal to the coking and the requirement of heating up and the holding time for the coal to coke at the temperature selected for reactor 1. The geometry can be rotationally symmetrical in a tubular form where a very compact gasification process can be achieved to a more voluminous design similar to a furnace, and then without the requirement to be rotationally symmetrical. The size of the reactors can be designed from a small scale to a very large industrial scale.

The synthesis gas S (H2 and CO) from the gasification reactor 1 contains up to 60% hydrogen gas and the remainder carbon monoxide, carbon dioxide or methane based on the composition of incoming process gas P.

The degree of thermal efficiency of an indirectly heated gasification reactor with an inner reactor for the coking of coal becomes very high, and, including the previous pyrolysis step and the necessary drying, can achieve up to 80% thermal efficiency for such integrated equipment.

The invention claimed is:

1. A method for producing coke during indirectly heated gasification, comprising:
  supplying coal particles to a gasification reactor;
  supplying process gas during the gasification, the process gas being reduced to synthesis gas (S); and
  removing the synthesis gas from the gasification reactor, wherein
  at the same time a gasification takes place, a coking of coal takes place in an inner reactor arranged vertically inside the gasification reactor, the inner reactor is indirectly heated, coke and combustible gases are produced in the inner reactor during the coking, and the combustible gases are used for the indirect heating in the gasification in the gasification reactor, and during the production of coke and combustible gases in the inner reactor the coal travels downwards in the inner reactor and the combustible gases travel upwards in the inner reactor.

2. The method according to claim 1, wherein the process gas is preheated by heat exchange of the synthesis gas.

3. The method according to claim 1, wherein the inner reactor is indirectly heated.

4. The method according to claim 1, wherein during the coking the coal gives off combustible gases that are utilized.

5. The method according to claim 1, wherein the temperature in the gasification reactor and the inner reactor is within the interval of 750°-1300° C.

6. The method according to claim 1, the pressure in the gasification reactor can be controlled from atmospheric pressure to a pressure above 100 bar.

7. An apparatus for producing coke during indirectly heated gasification, comprising:
    a gasification reactor;
    burners arranged in the gasification reactor that generate radiant heat;
    an injection nozzle for supplying coal particles and process gas to the inside of the gasification reactor, that a
    an inner reactor arranged vertically in the gasification reactor, and that the inner reactor being formed in such a manner that coal particles pass the inner reactor during coking,
    means for conducting combustible gases produced during the coking from the inner reactor to the burners, wherein
    the apparatus is configured that during the production of coke and combustible gases in the inner reactor the coal travels downwards in the inner reactor and the combustible gases travel upwards in the inner reactor.

8. The apparatus according to claim 7, wherein the inner reactor has a supply end for coal particles located outside of the gasification reactor and that the inner reactor has a discharge end for the coked coal located outside of the gasification reactor.

9. The apparatus according to claim 7, wherein the apparatus further comprises a first heat exchanger for heating process gas and cooling synthesis gas.

10. The apparatus according to claim 9, wherein the apparatus further comprises a second heat exchanger that extracts heat from waste gases from the combustion in the burners.

11. The apparatus according to claim 8, wherein the apparatus further comprises a first heat exchanger for heating process gas and cooling synthesis gas.

12. The apparatus according to claim 11, wherein the apparatus further comprises a second heat exchanger that extracts heat from waste gases from the combustion in the burners.

13. The method according to claim 2, wherein the inner reactor is indirectly heated.

14. The method according to claim 1, wherein the process gas is steam or recovered or purified waste gas from a combustion stage.

15. The method according to claim 1, wherein the synthesis gas contains up to 60% hydrogen gas with the remainder being carbon dioxide, carbon dioxide or methane.

16. The method according to claim 1, wherein thermal efficiency of up to 80% is achieved.

* * * * *